May 16, 1950 J. CLARK 2,507,501
PRESSURE OPERATED RESISTOR
Filed July 14, 1945 2 Sheets-Sheet 2
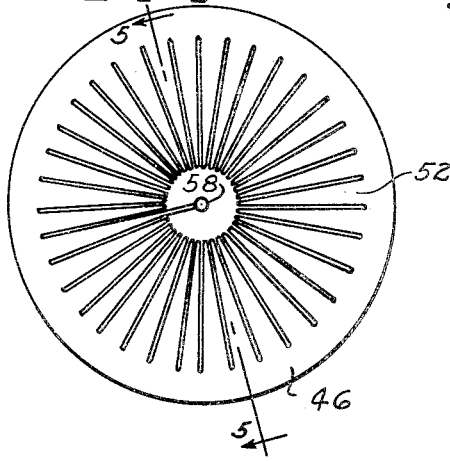
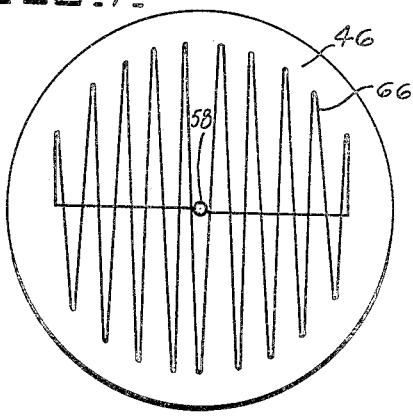
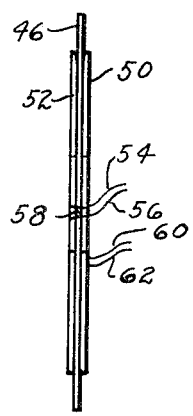
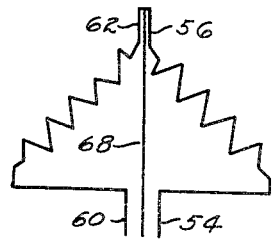
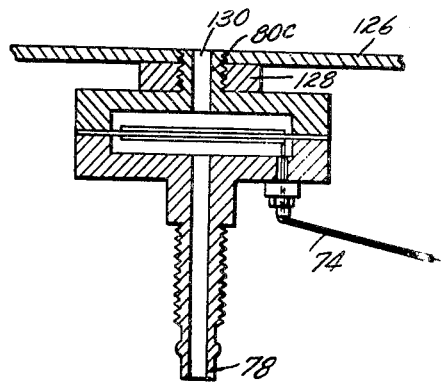
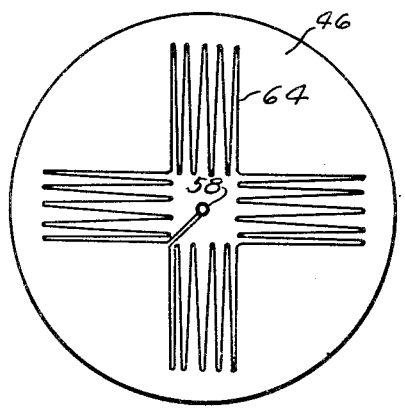
INVENTOR.
JAMES CLARK
BY
ATTORNEYS Patented May 16, 1950

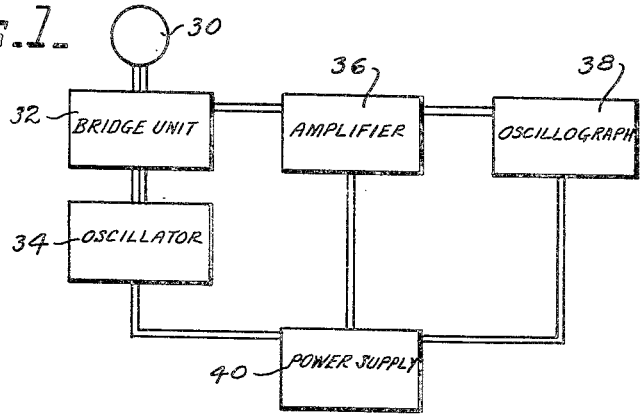
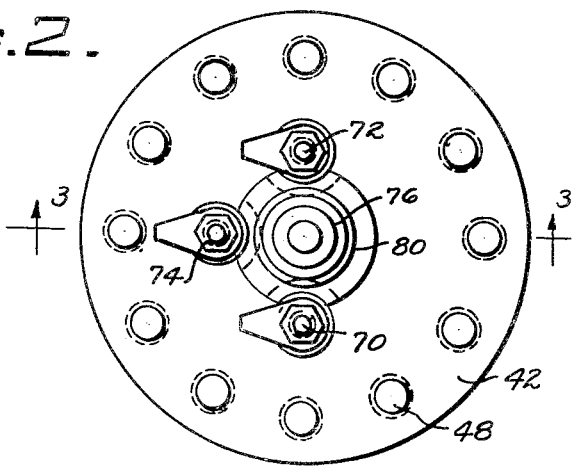
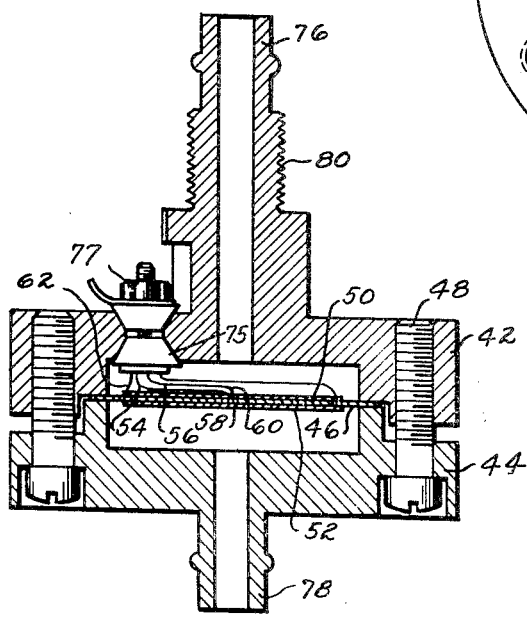

2,507,501

UNITED STATES PATENT OFFICE 2,507,501

PRESSURE OPERATED RESISTOR

James Clark, Dayton, Ohio

Application July 14, 1945, Serial No. 605,175

9 Claims. (Cl. 201—48)

(Granted under the act of March 3, 1883, as amended April 30, 1928; 370 O. G. 757)

The invention described herein may be manufactured and used by or for the Government for governmental purposes without payment to me of any royalty thereon.

This invention relates to a pressure measuring system and more particularly to equipment for measuring pulsating and steady pressures by electronic means.

It has been proposed to measure pulsating pressures by using pressure responsive diaphragms connected to sensitive carbon pile resistances whose output was recorded by an oscillograph. It was found, however, that where there is any appreciable diaphragm movement, the carbon granules tend to separate from each other, thus giving poor contact which has a nonlinear resistance characteristic, or they may pack together and refuse to follow the diaphragm pulsations. Moreover, upon repeated loading and unloading of the carbon granules which are in contact, the resulting abrasive action tends to pulverize them, whereby the clearance between the granules or carbon pile is continually raised.

The carbon pile devices above described are substantially an adaptation of the carbon button microphone which is used mainly where accurate response may be sacrificed for high output, as in throat microphones presently used by aircraft pilots.

It is also common practice in the art to connect pressure responsive diaphragms to velocity pickup units for picking up pulsating pressures, an example of this practice being the velocity microphone used in radio transmission, for which purpose the arrangement is highly desirable, since it operates upon a change in pressure. However, it will not operate on a constant pressure differential, and therefore cannot be used to pick up pressure differentials such as are encountered in aerodynamic and hydraulic flow. These pressure differentials are the difference between an unknown pulsating pressure and a known constant pressure, consisting of a steady or static pressure with a pulsating or dynamic pressure superimposed upon it. In order, therefore, to pick up these pressure differentials it is necessary for the pressure sensitive device to respond to the static pressure as well as the dynamic pressure.

It has also been proposed to use pressure responsive diaphragms as part of a variable condenser to pick up pressure pulsations. Such as variable capacity pickup however, has the disadvantage that if it is used in a D.-C. bridge it will only pick up the dynamic pressure, but will not pick up any static pressure differences since it responds only to a change in capacity. Moreover, if these capacity pickups are used in either a D.-C. bridge or an A.-C. bridge with an associate carrier system, it is necessary to have one stage of amplification adjacent to the pickup because of errors induced by the distributed capacitance of the leads to the condenser element, which results in a very large and bulky pickup which is impractical in aerodynamic and hydraulic applications.

Where optical systems with mirrors cemented to the pressure responsive diaphragm have been tried, the response to the device is so small for the pressure differentials being measured, that an elaborate optical system is required. The result is that, in most applications, the vibration of the component parts in the optical system causes a greater error than the response of the optical system to the movement of the pressure responsive diaphragm.

A "sylphon" with mirrors attached has been substituted for the flat diaphragm, but while it provides a greater deflection, the spring rate is so low that the resonant frequency is only from 10 to 20 cycles per second, which is entirely too low to measure the usual pulsating pressures encountered in aerodynamic and hydrodynamic flows. Moreover, the use of a "sylphon" in this situation is further limited because it expands and contracts with temperature changes which shifts the zero reference, whereby in wind tunnel and flight work the absolute value of the pressure differential is never certain since there is always a considerable temperature change with time in the wind tunnel and with altitude in flight work.

It is therefore an object of this invention to provide a device of the general character hereinbefore described but so constructed and arranged that it will accurately follow a pulsating pressure and will give a true value of the static and dynamic components of a pressure differential without shifting the zero reference in response to temperature changes.

Other objects and advantages will become evident as the invention is described in greater detail, reference being had to the drawings, wherein:

Fig. 1 is a schematic view of a pressure sensitive device and its associated equipment.

Fig. 2 is a top plan view of a pressure sensitive capsule showing a form of my invention wherein wire strain gauges are associated with a pressure sensitive diaphragm.

Fig. 3 is an axial section taken at 3—3 of Fig. 2 showing the interior construction of Fig. 2.

Fig. 4 is a bottom plan view of a preferred form of strain gauge arrangement bonded to a diaphragm and adapted for use in a pressure sensitive capsule of the type shown in Figs. 2 and 3.

Fig. 5 is an edge view of the device of Fig. 4 showing the arrangement of the strain gauges and their leads.

Figs. 6 and 7 are plan views of diaphragms having other arrangements of the strain gauges mounted thereon.

Fig. 8 is a diagram showing how the wires of the strain gauges are connected and leads brought out for connection to the bridge.

Fig. 9 is an axial section of a strain gauge capsule which is particularly adapted to mounting to the inside surface of an airfoil or hydrofoil, this form having an opening in the upper side to admit the unknown pulsating pressure on the upper side of the diaphragm and another opening to admit a reference pressure to the underside of the diaphragm.

Like reference characters refer to like parts throughout the several views.

Reference is made to Fig. 1, which is a diagrammatic representation showing how a pressure sensitive device, made according to this invention, is connected to its associated instruments. The pressure sensitive device 30 contains two arms of an A.-C. bridge 32 which are arranged to be affected by static or dynamic pressure variations received by the device. The other two arms of this bridge are adjustable and are contained in 32. The bridge is energized by an oscillator 34, the output of the bridge being fed into an amplifier 36, and the output of the amplifier being fed into an indicating meter or recording oscillograph 38. Power for these electronic circuits is furnished by a source of supply 40. The bridge 32, oscillator 34, amplifier 36, meter or recording oscillograph 38, and power supply 40 are commercially obtainable instruments or equipment well known in the art.

The pressure sensitive device may also be used in a bridge or potentiometer circuit in connection with a D.-C. amplifier, all of which are well known in the art, to indicate or record pulsating pressures. For convenience in further description the term "pressure microphone" will be used to indicate the larger pressure sensitive units while the term "capsule" will be used to indicate the smaller pressure sensitive units.

The pressure sensitive capsule shown in Figs. 2 and 3 comprises a housing made in two parts 42 and 44 with a diaphragm 46 between them, the whole being clamped together by screws 48 to effect pressure tight joints between the several parts.

Wire strain gauges 50 and 52 are exact duplicates and are cemented or otherwise bonded to opposite sides of the diaphragm 46, the leads 54 and 56 of the lower strain gauge 52 being brought to the upper side of the diaphragm through a small opening 58 which is afterward pressure sealed. Fig. 4 shows the underside and Fig. 5 shows the edge of the diaphragm 46 and the two leads 54 and 56 extending through the small opening 58. The strain gauge 50 on the upper side of the diaphragm differs only from the gauge 52 in that the leads 60 and 62 remain above the diaphragm.

Fig. 6 shows the underside of the diaphragm 46 equipped with a strain gauge 64 of modified form while Fig. 7 shows a still further modification at 66, the leads in both modifications passing through to the upper side of the diaphragm through the small opening 58 as before, and each form of gauge being duplicated on the upper side of the diaphragm.

The strain gauges shown in Figs. 4, 5, 6 and 7 may preferably be made by winding resistance wire on a form which may consist of a plurality of pins extending upward from a plane surface, the pins being positioned to produce the several configurations shown. A piece of thin paper or plastic foil may first be pressed down over the pins and the wire then wound and cemented to the paper or foil. After the cement has hardened, the gauge and paper or the foil, if that is used, are together lifted from the pins and transferred to and secured on the diaphragm, one gauge on each side thereof. The leads on the gauge on the underside of the diaphragm are drawn through the small opening and cemented therein pressure tight and so that the leads do not touch the edges of the opening. It is noted that, other things being equal, the strain gauge shown in Figs. 4 and 5 is the most sensitive, since the more nearly the convolutions of the strain gauge are radially disposed on the diaphragm the greater the strain produced in the gauge wire by unit deflection of the diaphragm. The direction of stress and consequently strain in any circular diaphragm clamped at the edge and uniformly loaded follows radial lines from the center of the diaphragm outward and becomes a maximum at a position adjacent the clamped edge. The equation for strain at the clamped edge of the diaphragm is:

$$e = \frac{3qr^2}{4h^2E}$$

wherein, $e$=unit strain,
$q$=distributed load/unit area,
$r$=radius of free diaphragm,
$h$=thickness of diaphragm,
$E$=modulus of elasticity.

Fig. 8 shows how the two leads 54 and 56 of the lower strain gauge 52 which came up through the small opening 58, and the two leads 60 and 62 of the upper strain gauge 50 are joined, the two leads 56 and 62 being connected and a common lead 68 taken from the point of connection, leaving three leads to be brought out through the body part 42.

Referring again to Figs. 2 and 3, the upper housing part 42 contains three terminal posts 70, 72 and 74 which are insulated from the body by frusto-conical insulating bushings 75, the interfacing ends of which are drawn together by nuts 77, the bushings being cemented or otherwise pressure sealed in the housing. The leads 54, 60 and 68 (see Fig. 8) are respectively connected to the heads of the terminal posts 70, 72 and 74 (see Fig. 2) and from these posts conductors extend to the bridge 32 as seen in Fig. 1. In the drawing, the terminal posts are all in the upper housing part 42 but obviously they may all be in the lower housing part 44, or, if the leads of one of the strain gauges are not brought through the small opening in the diaphragm, part of the terminals may be placed in each of the housing parts. Pressure tube connections 76 and 78 communicate respectively with the pressure chambers above and below the diaphragm, one of the connections being adapted to receive a reference pressure and the other the dynamic or static pressure to be measured, or in lieu of a reference pressure, one chamber may be evacuated and sealed, in which case the measured pressure will be the absolute pressure, or one chamber may be provided with a selected reference pressure and sealed, and the other used to receive the pressure to be measured. A threaded hub 80 is provided for mounting the device.

The pressure capsule hereinbefore shown and described with reference to Figs. 1 through 8 when used in a D.-C. bridge or potentiometer circuit in conjunction with an A.-C. amplifier to indicate and record the dynamic part of pressure differentials, is particularly valuable in measuring gun blasts or other high frequency pressure variations.

In order that the output of the pressure sensitive capsule shown in either Figs. 2 and 3 may accurately portray any pulsating pressure which may be applied to it, it is necessary that the resonant frequency of its seismic system be higher than the frequency of any pulsating pressures which are to be measured. The seismic system of the pressure responsive capsule shown in Figs. 2 and 3 consists of the spring steel diaphragm 46 and the wire strain gauges 50 and 52. In designing this type of pressure responsive capsule it is required to select a diaphragm whose stiffness or spring rate and mass when substituted into the following equation will give a resonant frequency higher than the frequency of any pulsating pressures which are to be measured. In this equation, wherein, $$f_{D_1} = \frac{10.21}{2\pi r^2} \sqrt{\frac{Eh^3 g}{12(1-\mu^2)\gamma h}}$$

$f_{D_1}$=resonant frequency of diaphragm for wire strain gauges, cycles per second,
$r$=radius of free diaphragm,
$E$=modulus of elasticity,
$h$=thickness of diaphragm,
$g$=acceleration of gravity,
$\mu$=Poisson's ratio,
$\gamma$=weight/unit volume, density of diaphragm.

When a wire strain gauge is cemented or bonded to each side of a diaphragm they tend to stiffen the diaphragm, thus raising the resonant frequency. However, the mass which the gauges add to the diaphragm assembly tends to reduce the resonant frequency of the diaphragm assembly. In practice it has been found that the frequency rise due to the added stiffness just about compensates for the frequency drop due to the added mass, leaving the resonant frequency of the diaphragm with strain guages mounted thereon substantially that of the original diaphragm itself.

The pressure sensitive capsule shown in Fig. 9 is particularly adapted for measuring the pressure distribution on the surface of an airfoil. The skin 126 of the airfoil is provided on its underside with a nut 128 which is preferably soldered or welded thereto, the threaded hub 80c of the capsule being screwed into the nut 128. A pressure tube connection 78 is provided to admit a reference pressure, and an opening 130 through the threaded hub 80c admits the surface pressure on the airfoil which is to be measured. The coil leads which are to be connected to the bridge 32, Fig. 1, are brought out as at 74.

By thus mounting the pressure capsule directly beneath the airfoil surface, as in Fig. 9, the distance traversed by the pressure wave before it strikes the diaphragm is reduced to a minimum thus reducing time lag and pressure drop to a minimum, whereby high frequency pulsations in the air flow may be picked up. This type of installation is ideal for studying buffeting or unstable flow in wind tunnel or flight research work.

Having described my invention, I claim:

1. A device for translating fluid pressure into electrical phenomena, which comprises a housing, a flat disc-shaped diaphragm of uniform thickness throughout joined pressure tight at its outer edge to said housing, said diaphragm forming one side of a fluid pressure receiving chamber, a strain gauge consisting of a single piece of wire formed into convolutions covering subtantially the entire surface of said diaphragm and bonded to said diaphragm within said chamber, means for insulatedly conveying the ends of said wire through the wall of said chamber, and a passageway for conveying fluid pressure into said chamber.

2. A device as defined in claim 1 wherein the convolutions of said strain gauge are all substantially radial.

3. A device for translating fluid impulses into electrical impulses which comprises a housing consisting of a hollow body open on one side and a hollow cap for closing said open side, a flat disc-shaped diaphragm of uniform thickness throughout clamped at its outer edge between said hollow body and said hollow cap making a pressure tight joint therebetween and thereby dividing the interior of said housing into two chambers, a strain gauge consisting of a single piece of wire formed into convolutions which together cover substantially the entire surface of said diaphragm from a point near the center to a point near the outer clamped edge bonded to said diaphragm in each of said chambers, means for insulatedly conveying the ends of said strain gauges from said chambers, and a passageway for conveying fluid impulses into one of said chambers, the other of said chamber being evacuated and sealed, whereby a reference pressure is provided which is independent of ambient temperature and barometric pressure changes.

4. A device for translating fluid impulses into electrical impulses which comprises a housing consisting of a hollow body having an open side, and a hollow cap for closing said open side, a flat disc-shaped diaphragm of uniform thickness throughout clamped at its outer edge between said hollow body and said hollow cap making a pressure tight joint therebetween and thereby dividing the interior of said housing into two chambers, a strain gauge consisting of a single piece of wire formed into convolutions covering substantially the entire surface of said diaphragm and bonded to said diaphragm in each of said chambers, means for insulatedly conveying the ends of said strain gauges from said chambers, a passageway for conveying pneumatic impulses into one of said chambers and a passageway for conveying a reference pressure into the other of said chambers.

5. A device as defined in claim 4 wherein the first said passageway extends through a short screw threaded hub of sufficient length to reach through the skin of an airfoil and which is adapted to extend from within the airfoil, through and to the outer surface thereof, the end of said hub being flush with the outer surface of said airfoil, whereby the shortest possible length of air column between the outer surface of the airfoil and the diaphragm is achieved.

6. A device for electrically indicating variations in pressure which consists of a housing in two parts, a flat diaphragm of uniform thickness throughout clamped at its outer edge between the two said parts whereby said diaphragm may be flexed with a positive slope over substantially its entire surface, or with a negative slope over substantially its entire surface, depending upon the direction of the pressure differential, the interior of said housing being divided by said diaphragm into a pressure receiving chamber and a reference pressure chamber, a strain gauge bonded to said diaphragm in each of said chambers, the convolutions of said strain gauges being substantially radial, each convolution extending substantially from the center of the diaphragm substantially to the outer clamped edge thereof, whereby each convolution throughout its entire length is subjected at any one time to either tension or compression depending on the direction of diaphragm deflection, means for insulatedly conveying the leads of said strain gauges from said housing, a passageway for conveying pressure impulses into said pressure receiving chamber and a passageway for conveying a reference pressure into the other said chamber.

7. A device for electrically indicating variations in fluid pressure impulses which consists of a housing in two parts, a flat round diaphragm of uniform thickness throughout clamped pressure tight at its outer edges between the two said parts thereby dividing the interior of the housing into a pressure receiving chamber and a reference pressure chamber, a strain gauge bonded to said diaphragm in each of said chambers, means for insulatedly conveying the leads of one of said strain gauges into the chamber of the other strain gauge, means for insulatedly conveying the leads of both strain gauges from said other chamber, to the outside of said housing, a passageway for conveying a reference pressure into one of said chambers and a passageway for conveying pressure impulses into the other of said chambers.

8. A device as defined in claim 1 wherein the convolutions of and said strain gauge are arranged in four groups, the center line of each group being radial and spaced ninety degrees from the center line of the next, and each group being composed of a series of V shaped convolutions extending from the outside to the inside of a group, the entire series of convolutions being composed of one continuous piece of wire substantially as shown and described.

9. A device as defined in claim 1 wherein the strain gauge consists of a series of V shaped convolutions, the center lines of which are parallel to each other and the height of the V shaped convolutions is delimited by a circle the center of which is at the center of the middle V shaped convolution, substantially as shown and described.

JAMES CLARK.

REFERENCES CITED

The following references are of record in the file of this patent:

UNITED STATES PATENTS

| Number | Name | Date |
|---|---|---|
| 1,718,494 | Schurig | June 25, 1929 |
| 2,260,837 | Kuehni | Oct. 28, 1941 |
| 2,275,675 | Draper et al. | Mar. 10, 1942 |
| 2,318,102 | Ruge | May 4, 1943 |
| 2,319,219 | Draper et al. | May 18, 1943 |
| 2,360,886 | Osterberg | Oct. 24, 1944 |
| 2,365,015 | Simmons | Dec. 12, 1944 |
| 2,398,372 | Green | Apr. 16, 1946 |
| 2,398,401 | Bancroft et al. | Apr. 16, 1946 |
| 2,400,467 | Ruge | May 14, 1946 |
| 2,405,199 | Faust et al. | Aug. 6, 1946 |